United States Patent [19]

Iida

[11] 4,416,115
[45] Nov. 22, 1983

[54] INTERNAL COMBUSTION ENGINE WITH SUPERCHARGER

[75] Inventor: Koso Iida, Hiroshima, Japan

[73] Assignee: Toyo Kogyo Co., Ltd., Hiroshima, Japan

[21] Appl. No.: 267,857

[22] Filed: May 28, 1981

[30] Foreign Application Priority Data

Jun. 5, 1980 [JP] Japan .............................. 55-79051[U]

[51] Int. Cl.$^3$ ...................... F02M 35/10; F02D 23/00
[52] U.S. Cl. ........................................ 60/600; 123/336
[58] Field of Search ................. 60/600, 601, 602, 605, 60/611; 123/308, 336, 432, 564

[56] References Cited

U.S. PATENT DOCUMENTS

| | | | |
|---|---|---|---|
| 4,271,795 | 6/1981 | Naragawa et al. | 123/432 X |
| 4,304,097 | 12/1981 | Kondo et al. | 60/602 |
| 4,318,273 | 3/1982 | Nohira et al. | 60/611 |

Primary Examiner—Michael Koczo
Assistant Examiner—Peggy A. Loiacano
Attorney, Agent, or Firm—Wenderoth, Lind & Ponack

[57] ABSTRACT

A fuel supply system for an internal combustion engine having at least one combustion chamber comprises a supercharger, a fuel intake passage system leading from a source of air to the combustion chamber through the supercharger. A portion of the fuel intake passage system between the supercharger and the combustion chamber is divided into first and second intake passages having incorporated therein primary and secondary throttle valves. The primary throttle valve is operatively associated with a foot-operated acceleration pedal whereas the secondary throttle is adapted to be controlled by a pressure developed inside the fuel intake passage system at a position downstream of the throttle valves. A diaphragm valve unit is utilized to control the secondary throttle valve in response to the pressure inside the fuel intake passage system at that position.

7 Claims, 1 Drawing Figure

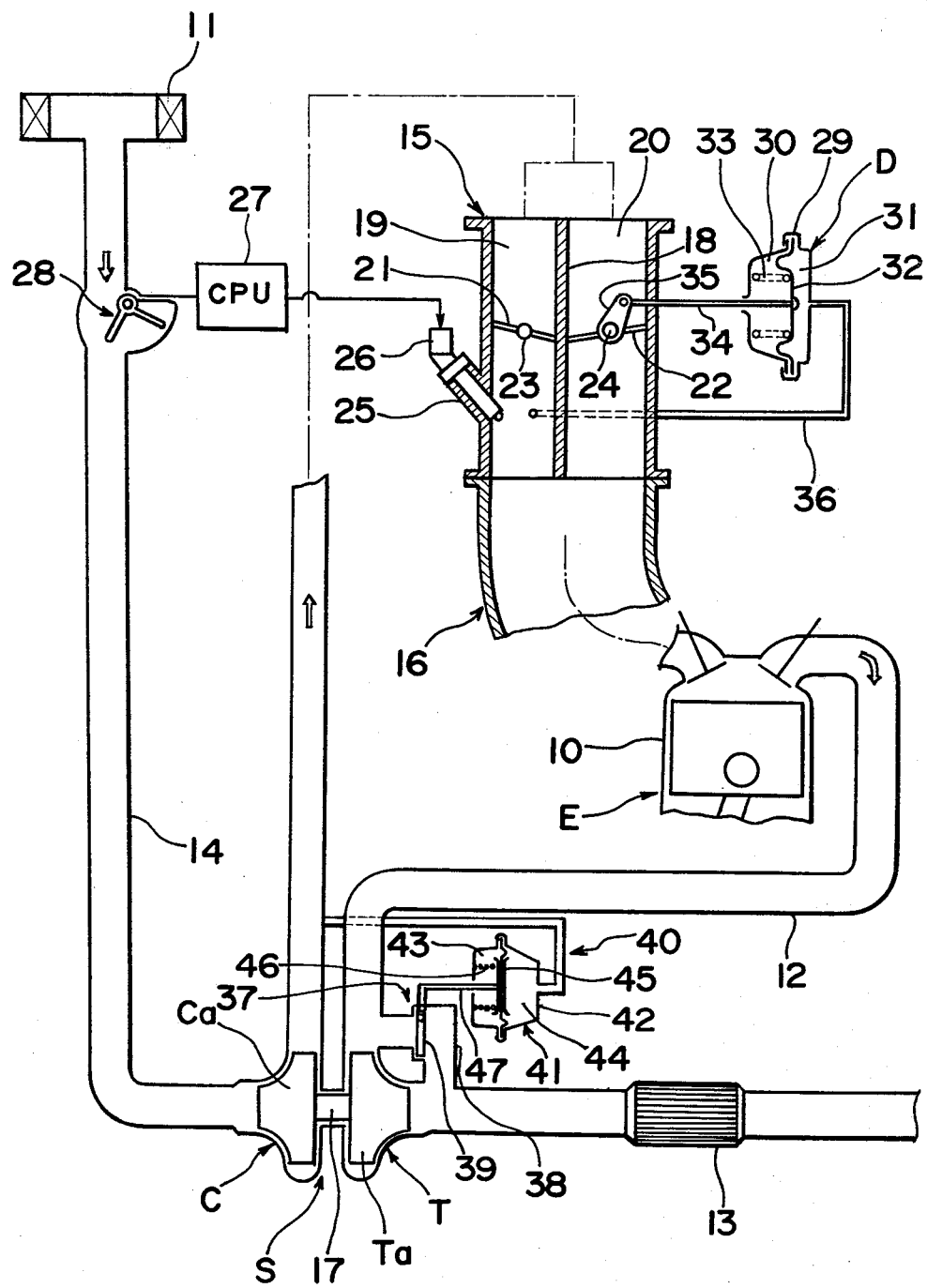

INTERNAL COMBUSTION ENGINE WITH SUPERCHARGER

BACKGROUND OF THE INVENTION

The present invention generally relates to a fuel supply system for an internal combustion engine and, more particularly, to a fuel supply system having a supercharger incorporated therein for boosting the power of the engine.

The use of a supercharger, or a turbo charger or turbo supercharger as it is generally called, is not a new and recent development. The supercharger is known as a means effective to boost the power of the engine with minimized fuel consumption and generally contains a compressor and a turbine linked together by a common shaft. The supercharger is usually driven by the turbine which is in turn driven by exhaust gases emitted from the engine, although on some engines the supercharger is driven by a belt or gears from the engine instead of by an exhaust-gas turbine.

There is known an automobile fuel supply system wherein the supercharger is installed at a position upstream of the primary and secondary or auxiliary throttle valves with respect to the direction of flow of an air-fuel mixture towards the engine.

In this known type of engine fuel supply system, because the amount of incoming air to be supplied to the engine in admixture with fuel can be controlled in multi-stage fashion, the use of the supercharger has brought about such advantages as improved accuracy in the metering of the incoming air, improved maneuverability of the acceleration pedal during low speed driving of an automobile and improved availability of negative pressure for both the exhaust-gas recirculating system and the ignition distributor.

However, some disadvantages are also present in the above described known system. Specifically, in order to minimize, or substantially eliminate, the possibility that lubricant oil used in the supercharger particularly for lubricating the common shaft may leak into the fuel supply system under the influence of a negative pressure developed during a low load operating condition of the engine, a limitation has been imposed that the throttle valves have to be installed at a portion of the fuel supply system downstream of the supercharger. Accordingly, in the known system wherein the secondary or auxiliary throttle valve is so designed as to be controlled by a negative pressure developed inside a venturi area which is formed inside a fuel passage at a position upstream of the primary throttle valve, the negative pressure inside the venturi area tends to be counterbalanced with a positive pressure supplied from the supercharger during a high load operating condition of the engine and, therefore, the secondary throttle valve cannot be controlled properly. In order to avoid this problem, it is possible to control the secondary throttle valve by the utilization of a positive pressure inside a fuel supply passage at a position upstream of the primary throttle valve, this possibility, however, bringing about another problem that an abrupt increase of the positive pressure which would instantaneously occur upstream of the primary throttle valve during deceleration of the engine leads to reduction in responsivity of the secondary throttle valve to return to a proper position, thereby resulting in an impairment of the feeling of deceleration.

In order to solve this problem, a fairly recent version of the automobile fuel supply system has been so designed that, while the primary throttle valve is operatively coupled to the acceleration pedal, the secondary throttle valve is operatively linked with the primary throttle valve by means of a mechanical linkage so designed as to forcibly open the secondary throttle valve when the acceleration pedal has been depressed to open the primary throttle valve to a predetermined opening, for example, 40°.

In this recent version, since the secondary throttle valve is forcibly opened irrespective of the amount of incoming air when and after the primary throttle valve has been opened to the predetermined opening, the secondary throttle valve is unnecessarily opened even during the particular engine operating condition, for example, low-speed operating condition and high load operating condition, in which the supply of the incoming air controlled only by the primary throttle valve is considered sufficient.

SUMMARY OF THE INVENTION

The present invention has been developed with a view to substantially eliminating the above described disadvantages and inconveniences inherent in the prior art fuel supply systems having the supercharger incorporated therein and has for its essential object to provide an improved fuel supply system of a similar kind wherein the opening of the secondary throttle valve is controlled by a pressure developed inside the fuel supply system at a position downstream of any one of the primary and secondary throttle valves to achieve the supply of a combustible air-fuel mixture which meets the air-fuel requirements of the engine then being operated.

According to the present invention, the fuel supply system for an internal combustion engine having at least one combustion chamber includes a fuel intake passage means which communicates at one end with a source of air through a supercharger and at the other end with the combustion chamber. A portion of the fuel intake passage means between the supercharger and the combustion chamber has a partition wall formed therein for defining first and second intake passages and also has primary and secondary throttle valves accommodated respectively within the first and second intake passages. While the primary throttle valve is operatively coupled to an acceleration pedal, the secondary throttle valve is controlled by a pressure developed inside the fuel intake passage means at a position downstream of any one of the primary and secondary throttle valves with respect to the direction of flow of air towards the combustion chamber. For this purpose, the fuel supply system also includes means for opening the secondary throttle valve only when the pressure inside the fuel intake passage means at the position downstream of any one of the throttle valves becomes equal to or higher than a predetermined value.

BRIEF DESCRIPTION OF THE DRAWING

These and other objects and features of the present invention will become apparent from the following description taken in conjunction with a preferred embodiment thereof with reference to the accompanying drawing which illustrates a schematic sectional view of the fuel supply system with an essential portion thereof shown on an enlarged scale.

DETAILED DESCRIPTION OF THE EMBODIMENT

Referring to the drawing, an automobile internal combustion engine E is shown to have at least one combustion chamber 10 having a fuel intake port which communicates with an air cleaner 11 by means of a fuel intake passage means, and an exhaust port which communicates with the atmosphere through an exhaust manifold 12 by way of an exhaust gas purifying unit 13 which may be either one or a combination of any known catalytic converter and afterburner. The fuel intake passage means leading from the air cleaner 11 to the combustion chamber 10 includes an air intake duct 14, a fuel control barrel 15 and an intake manifold 16 all fluid-connected in the order given from the air cleaner 11 to the combustion chamber 10.

A supercharger S is of any known construction and comprises a compressor C having a rotor Ca, a turbine T having a rotor Ta, and a common shaft 17 connecting the compressor and turbine rotors Ca and Ta together. The compressor C is installed in the air intake duct 14 so as to compress air drawn from the atmosphere through the air cleaner 11 and then to supply it to the fuel control barrel 15 during rotation of the compressor rotor Ca whereas the turbine T is installed in a portion of the exhaust manifold 12 between the engine E and the purifying unit 13 with the turbine rotor Ta adapted to be driven by exhaust gases flowing through the exhaust manifold 12. As is well known to those skilled in the art, the rotation of the turbine rotor Ta caused by the flow of exhaust gases flowing in the exhaust manifold from the combustion chamber towards the atmosphere is transmitted by means of the common shaft 17 to the compressor rotor Ca to drive the supercharger S.

The fuel control barrel 15 has a lengthwisely extending partition wall 18 defined therein and dividing the hollow of the barrel 15 into first and second intake passages 19 and 20 which communicates at one end with a portion of the air intake duct 14 downstream of the supercharger C with respect to the direction of flow of air towards the engine E and at the opposite end with the combustion chamber 10 through the intake manifold 16. The fuel control barrel 15 also has primary and secondary throttle valves 21 and 22 supported inside the first and second intake passages 19 and 20 by means of pivot shafts 23 and 24 for pivotal movement between opened and substantially closed positions, respectively.

The primary throttle valve 21 is operatively linked to a foot-operated accelerator pedal (not shown) in any known manner such that depression of the accelerator pedal results in the pivotal movement of the primary throttle valve 21 from the substantially closed position to the opened position. On the other hand, the secondary throttle valve 22 is adapted to be controlled by a pressure developed inside the first intake passage 19 at a position downstream of the primary throttle valve 21 with respect to the direction of flow of the air towards the combustion chamber 10 in a manner as will be described in detail below.

The engine E utilizes a fuel injection system comprising a fuel injection nozzle 25 so supported by the fuel control barrel 15 as to spray a mist of fuel into the fuel intake passage 19 downstream of the primary throttle valve 21. As is well known to those skilled in the art, the spraying of the fuel through the injection nozzle 25 is effected by a fuel pump 26 controlled by a computer or electronic control unit 27 in dependence on the rate of flow of air detected by an air flow meter 28 which is disposed on a portion of the air intake duct 14 between the supercharger S and the air cleaner 11. The fuel injection system used in the practice of the present invention is well known to those skilled in the art and, therefore, the details thereof are herein omitted for the sake of brevity. It is to be noted that the position of the nozzle 25 is not limited to such as is shown, but can be anywhere between the throttle valves and the combustion chamber 10 as is well known to those skilled in the art.

For controlling the secondary throttle valve 22, the fuel supply system embodying the present invention also comprises a diaphragm valve unit D. This valve unit D comprises a valve housing 29, the interior of which is divided into an atmospheric chamber 30 and a pressure working chamber 31 by a diaphragm member 32, and a biasing spring 33 housed within the atmospheric chamber 30 and biasing the diaphragm member 32 to the right as viewed in the drawing. The diaphragm member 32 is operatively coupled to the secondary throttle valve 22 by means of a connecting rod 34 having one end rigidly secured to the diaphragm member 32 and the other end pivotally connected to a link member 35 which is positioned externally of the fuel control barrel 15 and which is fast with the pivot shaft 24. In this arrangement so far described, by the action of the biasing spring 33, the secondary throttle valve 22 is normally held in the substantially closed position as shown. The working chamber 31 communicates with the first intake passage 19 by means of a pressure transmitting duct 36 having one end held in communication with the working chamber 31 and the other end opening into the first intake passage 19.

The valve unit D of the construction described above is so designed that, only when and after the pressure developed inside the first intake passage 19 at a position downstream of the primary throttle valve 21 becomes equal to or higher than a predetermined value determined by the biasing force of the spring 33, i.e., the load imposed by the spring 33 on the diaphragm member 32, the secondary throttle valve 22 can be opened, i.e., moved from the substantially closed position towards the opened position, the opening of valve 22 being dependent on the magnitude of such pressure.

In designing the valve unit D, care is required to select the biasing spring 33. In other words, the biasing spring 33 should be of a type capable of exerting, or should be adjusted so as to exert, a biasing force of such a magnitude that can be overcome by the pressure prevailing inside the first intake passage 19 at the position downstream of the primary throttle valve 21 at the time the amount of air flowing through the first intake passage 19 past the primary throttle valve 21 becomes short, having departed from the engine requirements.

From the foregoing, it has now become clear that, when and after the pressure inside the first intake passage 19 downstream of the primary throttle valve 21 has become equal to or higher than the predetermined value, the diaphragm valve unit D opens the secondary throttle valve 22 independently of the primary throttle valve 21, it being, however, understood that, depending on the particular engine operating condition under which the engine is operated, the opening of the secondary throttle valve 22 may be a function of the opening of the primary throttle valve 21.

Specifically, when the engine E is decelerated by releasing the accelerator pedal, the primary throttle valve 21 operatively associated with such accelerator pedal is substantially closed with the result that the pressure inside the first intake passage 19 is reduced to develop into a negative pressure. This negative pressure is in turn introduced readily by means of the duct 36 into the working chamber 31 of the valve unit D to hold the secondary throttle valve 22 in the substantially closed position by the cumulative effect of the spring 33 and the negative pressure. In view of this, when the engine is desired to be decelerated, the secondary throttle valve 22 can quickly respond to reduction in pressure inside the fuel intake passage means downstream of the throttle valves 21 and 22, without substantially impairing the feeling of deceleration.

Thus, it has now become clear that, since the secondary throttle valve 22 is controlled substantially independently of the primary throttle valve 21 with no mechanical linkage present between these throttle valves, not only can an accurate control of the amount of air to be supplied into the combustion chamber be possible in dependence on the load imposed on the engine, but also the secondary throttle valve can quickly respond to reduction in pressure when it is desired to decelerate the engine without substantially impairing the feeling of deceleration.

It is to be noted that, in the construction so far described, there may be a possibility that, unless the supercharger S is brought to a halt, the secondary throttle valve 22 remains opened even when and after the primary throttle is closed. This is particularly true where the end of the duct 36 remote from the valve unit D opens into the second intake passage 20 at a position downstream of the secondary throttle valve 22 or into the intake manifold 16 or unless, in the embodiment shown, the opening of the end of the duct 36 remote from the valve unit D is located at a position spaced a sufficient distance from the position where the first and second intake passages 19 and 20 adjoin in the vicinity of the intake manifold 16. This possibility can advantageously be eliminated by providing a bypass passage means 37 on the exhaust manifold 12 for bypassing the exhaust gases round the turbine T. The bypass passage means 37 is constituted by a bypass passage 38 which communicates at its opposite ends with respective portions of the exhaust manifold 12 upstream and downstream of the turbine T with respect to the direction of flow of the exhaust gases towards the atmosphere and includes a shut-off valve 39 for selectively closing and opening the bypass passage 38.

This shut-off valve 39 is adapted to be controlled by a control unit 40 which comprises a diaphragm valve assembly 41 which is similar in construction to the diaphragm valve unit D and which includes a housing 42, the interior of which is divided into atmospheric and pressure working chambers 43 and 44 by a diaphragm member 45, and a biasing spring 46 housed in the atmospheric chamber 43 for biasing the diaphragm member 45 to the right as viewed in the drawing. The diaphragm member 45 is operatively coupled to the shut-off valve 39 by means of a connecting rod 47 such that, only when the diaphragm member 45 is displaced towards the left against the biasing spring 46, the valve 39 can be opened to establish a bypass passage for the exhaust gases, thereby bringing the supercharger S to a halt. The working chamber 44 communicates with the compressor C, or with a portion of the intake duct 14 between the supercharger S and the control barrel 15 so that the increased pressure inside that portion of the intake duct 14 between the supercharger C and the throttle valves 21 and 22 which occur when and after the throttle valves 21 and 22 have been closed, that is, when and after the engine has been decelerated, can be introduced into the chamber 44 to displace the diaphragm member 45 towards the left against the spring 46.

It is to be noted that the control unit 40 may be constituted by an electric or electronic control unit including an electromagnetic drive for operating the shut-off valve 39 in response to the detection of the decelerating condition of the engine. Some parameters necessary to activate the electronic or electric control unit may include the negative pressure inside the first intake passage at a position downstream of the primary throttle valve 21 and one or a combination of the velocity of the automobile and the position of the accelerator pedal.

Although the present invention has fully been described in connection with the preferred embodiment thereof with reference to the accompanying drawing, it is to be noted that various changes and modifications are apparent to those skilled in the art. By way of example, the fuel control barrel 15 may be an integral part of the intake manifold 16 although it has been described as constituted by a member separate from the intake manifold 16.

In addition, irrespective of whether the barrel 15 is an integral part of the intake manifold 16 or a member separate therefrom, the intake manifold may have a lengthwisely extending partition wall dividing the hollow of the manifold 16 into first and second passage extensions respectively in communication with the first and second intake passages 19 and 20. In such case, the end of the pressure transmitting duct 36 remote from the valve unit D must open into the first intake passage 19 or the first passage extension at the position downstream of the primary throttle valve 21. Also, in such a case, the bypass passage means 37 serves to avoid any possible overpressure from occurring between the compressor C and the throttle valves 21 and 22 even though the secondary throttle valve 22 can be closed without bringing the supercharger S to a halt. Moreover, this arrangement is advantageous in that the responsiveness of the valve unit D to the reduction in pressure inside the first intake passage or the first passage extension can be increased, and that, since the supply of air can be concentrated on the first intake passage 19 andthe first passage extension, thereby enabling it to flow at an increased velocity towards the combustion chamber 10, atomization and evaporation of the fuel injected from the nozzle when the latter is arranged so as to inject the fuel into the first intake passage in the manner as shown or the first passage extension can be facilitated.

Furthermore, although the supercharger C employed is in the form of a turbo supercharger or a turbo charger because of the employment of the exhaust-gas turbine T, the supercharger or compressor may be driven by a belt or gears from the engine E.

Yet, in the embodiment described and shown, although the end of the duct 36 remote from the valve unit D has been described as opening into the first intake passage 19 it may open into the intake manifold 16.

Such changes and modifications are to be construed as included within the true scope of the present invention unless they depart therefrom.

I claim:

1. A fuel supply system for an internal combustion engine having at least one combustion chamber, which system comprises, in combination:
   a supercharger;
   a fuel intake passage means communicating at one end with a source of air through said supercharger and at the opposite end with the combustion chamber, a portion of said fuel intake passage means between said supercharger and the combustion chamber having a partition wall formed therein for defining first and second intake passages;
   an exhaust manifold leading from the combustion chamber to the atmosphere for discharge of exhaust gases emitted from the engine;
   primary and secondary throttle valves operatively housed within said first and second intake passages, respectively, for regulating the flow of air towards the combustion chamber, said primary throttle valve being adapted to be controlled by an acceleration pedal;
   means for biasing said secondary throttle valve to assume a closed position to substantially close said second intake passage;
   means, responsive to the pressure inside a portion of said fuel intake passage means at a position downstream of at least one of said primary and secondary throttle valves and upstream of the combustion chamber with respect to the direction of flow of air towards the combustion chamber, for opening said secondary throttle valve against said biasing means when the pressure attains a value at least as great as a predetermined value, such that opening of said secondary throttle valve gradually increases with increases in the pressure; and
   a fuel injecting nozzle for supplying fuel to the combustion chamber in admixture with the air fed through said intake passage means in a controlled air-fuel mixing ratio.

2. A system as claimed in claim 1, wherein said displacing means comprises a diaphragm valve unit including a housing and a diaphragm member dividing the interior of the housing into first and second working chambers on respective sides thereof, said first working chamber communicating with the atmosphere, a linkage means connecting said secondary throttle valve to said diaphragm member, and a pressure transmitting duct having one end communicating with said second working chamber and the other end communicating with said fuel intake passage means at a position downstream of at least one of said primary and secondary throttle valves.

3. A system as claimed in claim 2, wherein said other end of said duct opens into said intake passage and wherein said at least one of said primary and secondary throttle valves consists of said primary throttle valve.

4. A system as claimed in claim 2 or 3, wherein said biasing means is housed within said first working chamber, the biasing force of said biasing means being transmitted to said secondary throttle valve through said linkage means.

5. A system as claimed in claim 4, wherein said supercharger is a turbo charger, said supercharger including a compressor, disposed on a portion of said fuel intake passage means between the air source and said primary and secondary throttle valves, and a turbine disposed on said exhaust manifold, said compressor being driven by said turbine, said turbine being in turn driven by the flow of exhaust gases through said exhaust manifold, and further comprising a bypass passage means, including a bypass passage, for bypassing the exhaust gases around said turbine and a valve means for selectively closing and opening said bypass passage, and means, responsive to deceleration of the engine, for opening said valve means to open said bypass passage to bring said supercharger to a halt.

6. A system as claimed in claim 1, wherein said at least one of said primary and secondary throttle valves comprises both of said primary throttle valve and said secondary throttle valve.

7. A system as claimed in claim 2, wherein said other end of said duct opens into said first intake passage and wherein said at least one of said primary and secondary throttle valves consists of both of said primary throttle valve and said secondary throttle valve.

* * * * *